UNITED STATES PATENT OFFICE.

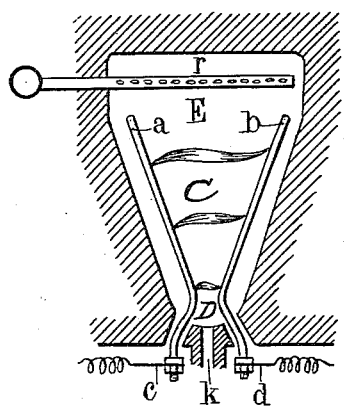
Fig. 1.
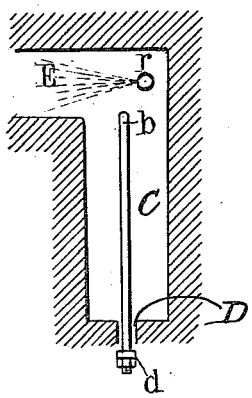
Fig. 2.
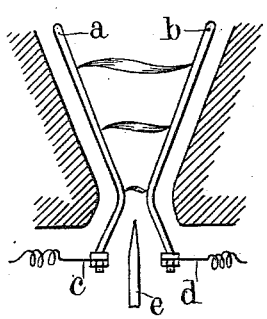
Fig. 3.
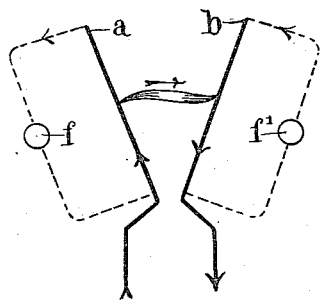
Fig. 4.
Fig. 7.
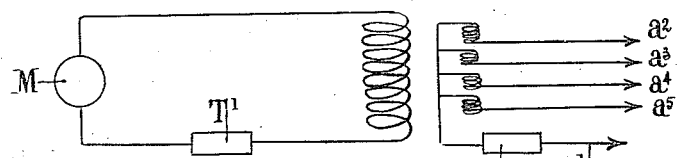

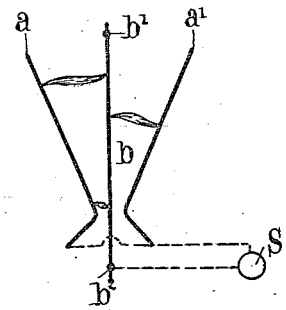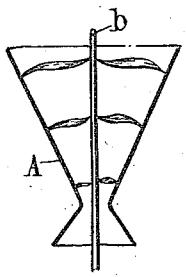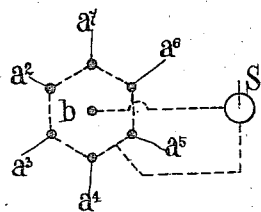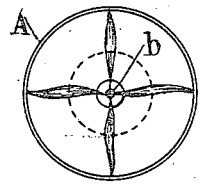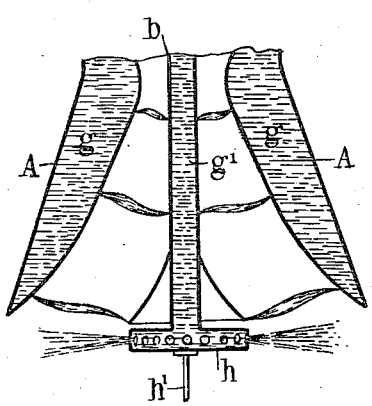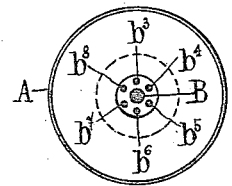

PAUL BUNET, OF PARIS, AND ADRIEN BADIN, OF SALINDRES, FRANCE, ASSIGNORS OF ONE-THIRD TO COMPAGNIE DES PRODUITS CHIMIQUES D'ALAIS & DE LA CAMAIGUE, OF SALINDRES, FRANCE, A CORPORATION OF FRANCE.

METHOD OF PRODUCING COMPOUNDS OF OXYGEN AND NITROGEN.

1,035,684.      Specification of Letters Patent.    Patented Aug. 13, 1912.

Application filed July 22, 1909. Serial No. 509,057.

*To all whom it may concern:*

Be it known that we, PAUL BUNET, of Paris, France, engineer, and ADRIEN BADIN, of Salindres, Gard, France, engineer, both citizens of the French Republic, have invented a certain new and useful Method of Producing Compounds of Oxygen and Nitrogen, of which the following is a full, clear, and exact specification.

The present invention relates to a method of producing compounds of oxygen and nitrogen, and has for object to remedy the notoriously insufficient yield of the processes employed hitherto for this manufacture.

The improved method is characterized as follows:—The processes hitherto known consist in the production of a flame (electric sparks, arc or the like) toward which is directed a considerable quantity of cold air of which a part only is heated to the temperature required by the reaction; there follows a more or less sudden cooling of the reacting gases, generally by mixture with the whole body of air introduced. The present process on the contrary consists in producing the electric arc in a very restricted space into which is passed a quantity of air as small as possible, so that as far as can be this air forms the arc itself; this arc is then suppressed, and another is formed which is likewise suppressed, and so on. In this way no air is uselessly heated and the useful air is heated to a very high temperature, which circumstances are very favorable to obtaining a large yield.

The carrying out of the process comprises one feature which is essential for attaining the final end sought; this is the use of one or more forks, resembling the arrangement known for lightning-arresters, to cause the formation and the displacement of moving layers of air constituting the successive arcs. The fork is located in a restricted space corresponding to its exterior shape, open at top and provided at bottom with an adjustable orifice, to allow the entrance or introduction of air to effect the blowing out of the arc. This arrangement allows of limiting as above stated the quantity of air admitted to that which can be combined by the passage of the current without question of the final cooling and of regulating it in proportion to the energy expended.

To cause the extinction of the successive arcs formed, there may be employed either air introduced after the reaction chamber, or water in the form of atomizing liquid or of steam or any other liquid or vapor causing a sudden cooling of the arc. The use of steam presents the advantage of avoiding the introduction into the apparatus of an electricity-conducting fluid, as all these liquids are to a greater or less extent; moreover liquids might wet the insulators and produce short-circuits. There may also be used as arc-extinguisher an alkali which will absorb part of the nitrous or nitric compounds in the form of compounds (nitrites or nitrates).

To avoid oscillations in the temperature of the electric arc from the point of its formation to that of its extinction, which forms an important factor from the point of view of the output, there is used a high tension alternating current of moderately high frequency (about 200 to 1000 periods per second) such as can be obtained directly from present commercial alternators, without fitting any special apparatus.

The invention comprises moreover certain arrangements of the typical apparatus above defined with a view to increasing the speed of travel of the arcs along the electrodes, as well as the number of arcs formed in unit time and consequently the output which depends thereon.

The following portion of the description indicates by way of example with reference to the annexed drawing how the above invention may be applied in practice, but it must be understood that the invention is not limited to the indications furnished.

In this drawing, Figures 1 and 2 are two sections at right angles to one another of the typical apparatus, Figs. 3 to 11 represent various modifications of this apparatus.

A high tension alternating current of frequency from 200 to 1000 after passing if necessary through a transformer which brings its tension to the desired altitude, is conducted as stated to the terminals of a fork of shape similar to that of a Thomson lightning arrester (Figs. 1 and 2). The dimensions of the fork and the separation of its arm *a b* depend upon the voltage and the strength of the current. At their lower ends the tubes which form the arms are bent as they approach so as to leave between them for a short distance a space of a few millimeters. They are placed vertically in a narrow chamber C of dimensions just sufficient to accommodate them. The walls of this chamber are of very refractory insulating material. Through the lower opening D of the chamber, which is located just below the contraction of the fork, air from the pipe $k$ is admitted in a constant stream or in intermittent puffs. The tubes are extended beneath and above the opening D and diverge from one another in a manner suitable to allow their lower ends to be connected to the current leads $c$ and $d$. The upper orifice of the chamber leads to a larger vessel E, in which are placed at $r$ rows of injectors or sprayers of air, liquids or steam intended to cause the extinction of the arcs. At the exit from the vessel E, the condensation of the liquids and of the nitrous products takes place in the towers usually employed for this purpose.

The operation of the apparatus will be readily understood: An arc is established at the narrowed throat of the forks and passes along these forks, rising at the same time that it extends and broadens. This arc which is only the air introduced at the lower opening strongly heated by the passage of the current, reaches the upper part of the forks and of the chamber, transformed into a mixture of air and of nitrous products. It is then suddenly extinguished and cooled. A second arc is then established at the lower end, and in its turn rises and is extinguished, and so on, in such a way that the operation of the forks and of the heating is uninterrupted. There may even be several arcs traveling at once along the forks.

The apparatus may comprise not one but several forks; in this case the narrow chambers containing them lead all to one common main passage.

The arrangements represented in Figs. 3 to 11 have been conceived with a view to increasing the speed of ascent of the arcs along the electrodes, which is obtained by means of a blast of compressed air or a magnetic blow-out, and to increasing their number by suitably increasing the surface of the electrodes or of one of them.

To increase the speed of ascent of the arcs between the forks of the apparatus, there can be employed (see Fig. 3) a jet of compressed air, which delivers between the electrodes below the zone of formation of the arc through a nozzle of small area, because a large supply is less necessary than high speed. The electrodes are represented at $a$ and $b$, to which the current is led by the wires $c$ and $d$, while $e$ is the compressed air nozzle.

There may be employed for the same purpose any suitable system of magnetic blow-out. That which is comprised in the object of the present invention is obtained by traversing the electrodes, or one only of them, by an auxiliary current of great intensity. It is to be noted indeed that the currents which passing by the electrodes are closed by the arcs produce within the fork between the electrodes a very weak magnetic field owing to their low intensity. The force upon the arc will be proportional to the square of the current, but if by means of auxiliary sources $f$ $f'$ the electrodes are traversed by a supplementary very powerful current for example one hundred times greater than the arc itself (Fig. 4) the force will become 100 times larger, and the acceleration of the arc will be likewise 100 times greater. In the case of alternating currents the sources of current $f$ and $f'$ may be replaced by transformers of which the primary circuit is connected in series or otherwise with the circuit of the electrodes.

When the electrodes are cooled by a current of liquid which circulates within them, these auxiliary magnetic blow-out circuits may be combined in any convenient way with the pipes conducting the cooling liquid to the electrodes.

In order to increase the number of arcs formed per unit of time between the electrodes, there may be employed an arrangement of the kind shown in Fig. 5. The electrodes $a$ $a'$ are electrically connected to one of the poles and the electrode $b$ is connected to the other. The electrodes $a$ $a'$ may be two or more in number, provided that they are arranged in a circle at equal distance from the central electrode $b$.

Fig. 6 represents in horizontal section this last arrangement, the dotted lines indicating the electrical connections and S the source of current. There is a certain advantage in not connecting the outer rods in parallel, but in supplying them on the contrary from independent sources, because it is easier in this way to obtain the maximum number of arcs. It is indeed to be noted that the voltage of the machine supplying an apparatus composed simply of two rods (Fig. 3) varies according to the position of the arc. When no arc exists the voltage rises to a value depending upon the apparatus, but necessarily sufficient to strike the arc at the point of minimum distance between the poles. When the arc is struck the voltage falls generally to a considerable extent; when the arc is broken at the splayed extremity, the voltage rises again to the value corresponding to establishment of the arc at the point of minimum distance. Therefore if the external conductors of the apparatus in Fig. 6 are all united, they have all the same difference of potential in relation to the central rod. The arc will be established on a rod which is nearer to the central rod, and then the voltage will be too low to arc upon the others. In practice there may be several arcs at once owing to movements of the heated air or other secondary causes, but there will not be the maximum number, nor the output of oxids of nitrogen that can be obtained with such an arrangement.

To increase the number of arcs, it suffices to render the different external branches independent. Each of them is connected to one pole of a special source of electricity. The other poles of all the sources are led to the central rod. It would not of course be practical to arrange one dynamo to each rod, but a single dynamo set to a constant voltage can be employed and provided with as many transformers as there are branches. More simply a single transformer only is used, having as many secondary circuits as there are branches.

Fig. 7 represents diagrammatically an arrangement of this sort, M being an alternator of constant low-tension, $b$ the central rod, and $a^2$ $a^3$ $a^4$ . . ., the exterior rods; if desired several branches may obviously be arranged on each circuit. The drop in voltage proper to the working of the apparatus takes place in each of the circuits which must be calculated accordingly. If necessary there may be added reaction coils for regulating the falls in voltage. There may also be employed the apparatus obtained by rotation of the device shown in Fig. 5, around its axis of symmetry. Fig. 8 shows this apparatus in vertical section and Fig. 9 in plan. This provides an electrode shaped like a truncated cone A, while the other electrode is a central rod $b$. This central electrode may consist of a single rod $b$ or else of a series of rods $b^3$ $b^4$ . . . . $b^8$ (Fig. 10) insulated from one another and respectively connected to different sources of electricity, the common pole being in this case the external cone A instead of the central electrode. The central electrode may also consist of a surface of revolution of suitable shape for example cylindrical or coned to a more acute angle than the truncated cone A, or again it may present at certain parts points upon which the arcs will strike, the part bearing these points being revoluble around the axis $b$ to produce these arcs in all vertical planes. Moreover all these electrodes may be hollow to allow of the circulation of cooling liquid.

If it be desired to combine the use of compressed air with this last device, the air is led continuously or intermittently to the annular space of minimum diameter existing between the exterior cone A and the central rod $b$. All these arrangements with central electrode lend themselves well to the magnetic blow-out described. This blow-out may be applied either to the central electrodes, or to the external electrodes or to both at once. In the case of Fig. 5 for example, the blow-out may be effected by supplying the central electrode $b$ from an auxiliary source of large amperage, connected to the points $b'$ and $b^2$ of the said electrode. In the case of Fig. 6, the blow-out can be arranged in the same manner at each of the side electrodes $a^2$ $a^3$ $a^4$ . . . $a^7$. Also a large current (3000, 10000 or more amperes) may be passed through the central rod from a quantity current transformer of which the primary is inserted in the circuit at T' or T$^2$ (Fig. 7) and the secondary is short-circuited on to the central rod. In the case of Fig. 10, the blow out can be arranged at each of the central rods $b^3$ . . . . $b^8$ or else at a single large bar B placed centrally of the apparatus.

With any arrangment, if all the arcs are not electrically in phase, it is advisable to produce a magnetic field for each of them and in phase with it.

It will be understood that the arrangements described above may be employed separately or in any combinations with one another, and that they may be applied whatever be the chemical part of the process of manufacture of the oxids of nitrogen, whatever be the arrangement used for cooling or extinguishing the arc and lastly whatever be the processes employed for absorbing or dissolving the compounds of nitrogen. In particular when the sudden cooling of the arc is effected by the use of water or of a liquid adapted to dissolve the compounds formed, it may be advantageous to employ the arrangement shown in vertical section in Fig. 11 which is derived from that indicated in Figs. 8 and 9. In this figure A and $b$ respectively designate as before the truncated conical electrode and the central one, which in the example shown are turned upside down, the large end of the truncated cone being at the bottom. These electrodes are hollow so as to allow the circulation of cooling liquid at $g$ $g'$. A small turbine $h$ arranged upon a spindle $h'$ at the bottom of the central electrode and fed by the cooling water of this electrode or by a separate pipe, is intended to throw this liquid in the form of a horizontal sheet in front of the rupture-zone of the arcs. The turbine can be operated by the liquid itself, if it is at sufficient pressure, or by a mechanical drive applied to its spindle $h'$.

It is to be understood that the electrodes may be turned in the same direction as in the arrangement of Figs. 1 to 8, or again in a horizontal or an oblique direction, but the inverted arrangement of Fig. 11 although requiring a more vigorous blow-out of the arcs, since it has to overcome instead of utilizing the ascensional movement due to the heating, presents the advantage of avoiding any fall of absorption liquid between the electrodes and the short-circuits that might result therefrom.

Having thus described our invention what we claim as such and desire to secure by Letters Patent is:—

1. A process for electrically producing compounds of oxygen and nitrogen, which comprises supplying successive layers of air to successive electric arcs, in a restricted space in which the reaction takes place, and in extinguishing the arcs by a cooling fluid acting at the outlet from the reaction chamber, the cooling fluid not passing into the said chamber.

2. A process for electrically producing compounds of oxygen and nitrogen, which comprises supplying successive layers of air to successive electric arcs, in a restricted space in which the reaction takes place, and in extinguishing the arcs at their exit from this space, the quantity of air admitted into the said space being limited as strictly as possible to the quantity of air supplied to the arcs themselves, said process being expedited by increasing the normal speed of arc propagation, substantially as described.

3. A process for electrically producing compounds of oxygen and nitrogen, which comprises supplying puffs of compressed air to successive arcs in a restricted space in which the reaction takes place and in extinguishing the arcs at their exit from this space, the quantity of air admitted into the said space being limited as strictly as possible to the quantity of air supplied to the arcs themselves.

4. A process for electrically producing compounds of oxygen and nitrogen, which comprises supplying successive layers of air to successive electric arcs, in a restricted space in which the reaction takes place, multiplying the formation of arcs in the manner described, and in extinguishing the arcs at their exit from this space, the quantity of air admitted into the said space being limited as strictly as possible to the quantity of air supplied to the arcs themselves.

5. A process for electrically producing compounds of oxygen and nitrogen, which comprises supplying successive layers of air to successive electric arcs, in a restricted space in which the reaction takes place, and in extinguishing the arcs at their exit from this space, the quantity of air admitted into the said space being limited as strictly as possible to the quantity of air supplied to the arcs themselves, the current employed being of moderately high frequency (between 200 and 1000 periods per second) to avoid oscillations in the temperature of the arc.

In testimony whereof we have signed our names to this specification, in the presence of two subscribing witnesses.

PAUL BUNET.
ADRIEN BADIN.

Witnesses:
BENJAMIN BLOCHE,
H. C. COXE.